US012448338B2

(12) United States Patent
Renaud et al.

(10) Patent No.: US 12,448,338 B2
(45) Date of Patent: Oct. 21, 2025

(54) PROCESS FOR THE MANUFACTURE OF A BIOSTIMULANT OR NATURAL FERTILIZER BASED ON FERMENTED MACROALGAE, NATURAL ADDITIVES AND PROBIOTIC BACTERIA FOR AGRICULTURE AND HORTICULTURE

(71) Applicant: Produits Bio Sun Inc., Montreal (CA)

(72) Inventors: Brigitte Renaud, Sainte-Agathe-des-Monts (CA); Michel Lachaume, Saint-Wenceslas (CA)

(73) Assignee: PRODUITS BIO SUN INC., Montreal (CA)

( * ) Notice: Subject to any disclaimer, the term of this patent is extended or adjusted under 35 U.S.C. 154(b) by 998 days.

(21) Appl. No.: 17/298,384

(22) PCT Filed: Nov. 28, 2019

(86) PCT No.: PCT/CA2019/051701
§ 371 (c)(1),
(2) Date: May 28, 2021

(87) PCT Pub. No.: WO2020/107116
PCT Pub. Date: Jun. 4, 2020

(65) Prior Publication Data
US 2022/0098124 A1 Mar. 31, 2022

Related U.S. Application Data

(60) Provisional application No. 62/772,497, filed on Nov. 28, 2018.

(51) Int. Cl.
*C05F 17/40* (2020.01)
*C05D 3/02* (2006.01)
(Continued)

(52) U.S. Cl.
CPC ............... *C05F 17/40* (2020.01); *C05D 3/02* (2013.01); *C05F 5/002* (2013.01); *C05F 11/00* (2013.01); *C05F 17/20* (2020.01)

(58) Field of Classification Search
CPC .......... C05F 17/40; C05F 5/002; C05F 11/00; C05F 17/20; C05F 5/008; C05D 3/02; Y02P 20/145; Y02W 30/40; C12N 1/20
See application file for complete search history.

(56) References Cited

U.S. PATENT DOCUMENTS

| 5,876,479 A | * | 3/1999 | Hedgpeth, IV | ......... C05F 11/00 71/11 |
| 2014/0342905 A1 | * | 11/2014 | Bullis | .................... A01N 63/20 504/100 |
| 2016/0017225 A1 | * | 1/2016 | Morash | .................. A23K 10/12 47/58.1 SC |

FOREIGN PATENT DOCUMENTS

| CN | 103710281 A | 4/2014 |
| CN | 104355749 A | 2/2015 |

(Continued)

OTHER PUBLICATIONS

Goudar Geera et al.: "Plant Growth Promotional Activity of Newly Developed Formulation of Azospirillum on Maize", International Journal of Current Microbiology and Applied Sciences, vol. 6, No. 12, Dec. 10, 2017 (Dec. 10, 2017), pp. 370-380, XP055936806, India, ISSN: 2319-7692, DOI: 10. 20546/ijcmas.2017.612.045, Abstract; tables 1,2.

(Continued)

*Primary Examiner* — Jennifer A Smith
(74) *Attorney, Agent, or Firm* — Brouillette Legal Inc.; Philippe Brouillette

(57) ABSTRACT

This invention concerns a process for the manufacture of a biostimulant based on fermented seaweed extracts, natural compounds and living bacteria to stimulate the growth and (Continued)

general vigour of plants while improving crop yields and crop quality. The process developed includes a microbial fermentation extraction technology involving a bacterial consortium comprised of bacteria selected from 3 strains of *Bacillus* sp, which concentrates in a liquid solution many molecules, nutrients and bioactive substances of agronomic interest from five varieties of seaweed (*Saccharina longicruris, Fucus vesiculosus, Ascophyllum nodosum, Chondrus crispus* and *Furcellaria lumbricalis*) harvested in the cold coastal waters of the Canadian Maritime Provinces.

21 Claims, 2 Drawing Sheets

(51) Int. Cl.
*C05F 5/00* (2006.01)
*C05F 11/00* (2006.01)
*C05F 17/20* (2020.01)

(56) References Cited

FOREIGN PATENT DOCUMENTS

| CN | 104774094 A | * | 7/2015 |
| CN | 106242662 A | | 12/2016 |
| CN | 106588145 A | | 4/2017 |
| CN | 107298601 A | | 10/2017 |
| CN | 108048332 A | | 5/2018 |
| CN | 108484314 A | | 9/2018 |

OTHER PUBLICATIONS

European Search Report dated Jul. 7, 2022 (Jul. 7, 2022), in the corresponding European Patent Application No. EP 19889647.4.
Written Opinion of the ISA dated Jan. 31, 2020 (Jan. 31, 2020) in the International phase of PCT application PCT/CA2019/051701.

* cited by examiner

PROCESS FOR THE MANUFACTURE OF A BIOSTIMULANT OR NATURAL FERTILIZER BASED ON FERMENTED MACROALGAE, NATURAL ADDITIVES AND PROBIOTIC BACTERIA FOR AGRICULTURE AND HORTICULTURE

CROSS-REFERENCE TO RELATED APPLICATIONS

The present application claims the priority of U.S. Patent Application No. 62/772,497 filed on Nov. 28, 2018, the contents of which are hereby incorporated by reference.

FIELD OF THE INVENTION

The present invention generally relates to the manufacture of natural biostimulants and biofertilizers for agricultural and horticultural purposes.

More precisely, the invention concerns a manufacturing process and a production unit for a biostimulant based on five types of macroalgae, natural additives and probiotics.

BACKGROUND OF THE INVENTION

The use of chemicals in agriculture has significantly increased agricultural production yields in recent decades. However, this practice has led to intensive land use, which has contributed to the depletion of nutrients available for crops. As a result, the area of arable land in the world is becoming smaller and smaller.

Several alternatives to chemical fertilizers have been proposed to meet this need, such as crop rotation or the use of organic fertilizers (UN, 2016). However, these methods do not fully reflect the reality of farmers. The ideal solution should increase yield while maintaining the same fertilizer application methods and remaining affordable for producers. It is in this perspective that biostimulants (especially seaweed extracts) have begun to emerge to meet this need. Indeed, they make it possible to promote the development of the plant in several aspects while maintaining a yield and product quality similar or even superior to the current production.

Due to the presence of a complex cell wall, different extraction techniques have been used to maximize the isolation of biologically active compounds from plant material. The traditional method of extracting biological molecules from marine algae is mainly by chemical or physical methods. In Canada, commercial seaweed extracts on the Canadian market (derived mainly from the brown seaweed *Ascophyllum nodosum*) are mainly prepared by alkaline chemical extraction and include high temperatures. This method inevitably affects the quality and quantity of extracted organic molecules and bioactive substances of agricultural interest. The manufacture of algae extracts by natural extraction as a biostimulant product is currently still poorly developed and none is known by the process of this invention.

Depending on the aspect of the invention, the process results in a final product of higher quality than the product resulting from chemical methods while ensuring a lower environmental impact. In addition, the process considerably reduces the waste from the manufacture of the biostimulant because part of the process waste can be recovered, which is a major advantage in the current context of sustainable development.

The various marine algae used in the invented process are harvested from the cold coastal waters of Canada's Maritime Provinces. Depending on the aspect of the process, which involves different stages of the process, the components measured in the biostimulant formulation are varied and numerous, such as macro- and micro-nutrients, amino acids, vitamins, phytohormones (auxins, cytokinins, ABA), other growth regulating substances (polysaccharides, polyphenols, amino acids, colloids, etc.,) as well as a wide variety of secondary metabolites with various biological activities. These different compounds are known to directly influence the cellular metabolism of treated plants. In the scientific literature, many beneficial effects have been reported, such as improved germination rates, increased yields, improved resistance to cold and to certain diseases, increased absorption of mineral elements from the soil or the shelf life of fruit (Jolivert et al 1991; New Ag International 2004; Phytoma NO 609, 2007). The many benefits measured following regular application of the biostimulant in both vegetable and ornamental crops, as well as in small fruit crops in the field and in shrubs and potted trees, corroborate the published studies and confirm the potential of the biostimulant.

In addition, marine algae also contain polysaccharides, betaines, polyunsaturated fatty acids, phlorotannins, phenolic compounds and carotenoids that would have significant antimicrobial activity and/or stimulate natural plant defence reactions (M. J. Perez et al 2015). The red and brown algae that make up the biostimulant formulation are a source of unusual and complex polysaccharides that are not found in terrestrial plants (Bruneton 1993). Thus, the brown algae used (*Ascophyllum nodosum, Fucus vesiculosus* and *Saccharina longicruris*) contain laminarin, fucoidan and alginate polysaccharides while the red algae used (*Chondrus crispus* and *Furcellaria lumbricalis*) contain different carrageenans.

The effects observed following the application of the biostimulant indicate a protective effect on several plant varieties grown in nurseries and greenhouses and tested in comparison to the respective control group. The regular supply of the biostimulant increases the vigour of the plants while improving their resistance to leaf infections. Although the mode of action of the components constituting the biostimulant is not fully understood, the effects noted and measured confirm the agronomic potential of the biostimulant.

However, the composition of algal extracts changes according to the harvesting season (Moen et al., 1997), the harvesting location, the varieties used and the extraction process (Craigie et al., 2007). According to the developed process, the content of the various organic compounds constituting the biostimulant remains high compared to the algae extracts marketed. And although the mode of action of these compounds is not fully understood, the beneficial effects noted and measured in the different plant crops tested confirm the agronomic potential of the new product.

Tests performed with the biostimulant according to the aspect of the process revealed significant plant benefits on a large number of varieties of vegetables, berries, ornamentals and trees, including the following:
  stimulation of germination and seedling development;
  promotion of the rooting of young herbaceous and woody plants;
  allowance of better plant growth and vigour;
  increases in yields, quality and harvesting time;
  improvement in resistance to stress and disease;
  increase in cold and frost tolerance;

strengthening and lengthening of leaf colours in the autumn; and better preservation of fruit and vegetables.

Despite the above, there remains a need for an improved method to produce naturally derived biostimulants or fertilizers as alternatives to chemical fertilizers for agriculture and horticulture.

SUMMARY OF THE INVENTION

The shortcomings of the prior art are generally mitigated by a new method for the manufacture of a biostimulant or natural fertilizer based on fermented macroalgae, natural additives and probiotic bacteria for agriculture and horticulture.

In one aspect of the present invention, the method for the manufacture of the biostimulant or natural fertilizer based on fermented macroalgae comprises the steps of preparation, fermentation and separation. The preparation steps include washing, drying, grinding, micronizing and mixing of the biomass with treated water. The fermentation steps include the preactivation of spores and anaerobic fermentation with the addition of organic additives. The resulting product is later separated via filtration or centrifugation, depending on the final use of the biostimulant.

In a complete embodiment, the method for the manufacture of a biostimulant or natural fertilizer based on the fermentation of algae comprises the following steps:
i) harvesting, washing, drying and grinding of seaweed;
ii) micronization step for dried seaweed;
iii) homogeneous mixing of the seaweed in an aqueous solution;
iv) preactivation of bacterial spores;
v) adding the preactivated bacterial spores to the aqueous solution and allowing the solution to ferment under aerobic conditions;
vi) adding organic additives; and
vii) separating the components of the fermented solution.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

The invention comprises a method (or process) for manufacturing a natural biostimulant (or natural fertilizer) based on fermented algae for use in agricultural or horticultural applications.

For purposes of the present application, the words "method" and "process" are used interchangeably.

For purposes of the present application, the words "algae", "macroalgae" and "seaweed" are used interchangeably.

For purposes of the present application, the expressions "natural additives" and "organic additives" are used interchangeably.

For purposes of the present application, the word "micronize" signifies breaking down a substance (for example, algae) into very fine particles.

In its simplest form, the process comprises the following steps:
i) homogeneous mixing of algae in an aqueous solution;
ii) adding preactivated bacterial spores; and
iii) allowing aerobic fermentation of the aqueous solution.

Following aerobic fermentation of the aqueous solution, organic additives are added to the aqueous solution to create a post-fermentation solution. The post-fermentation solution is then separated in one or more separation steps.

The one or more separation steps comprise:
i) filtering the solution to remove the coarsest particles; and
ii) collecting the filtrate.

The collected filtrate may then be clarified through centrifugation, and the supernatant is collected and bottled.

Figure 1:
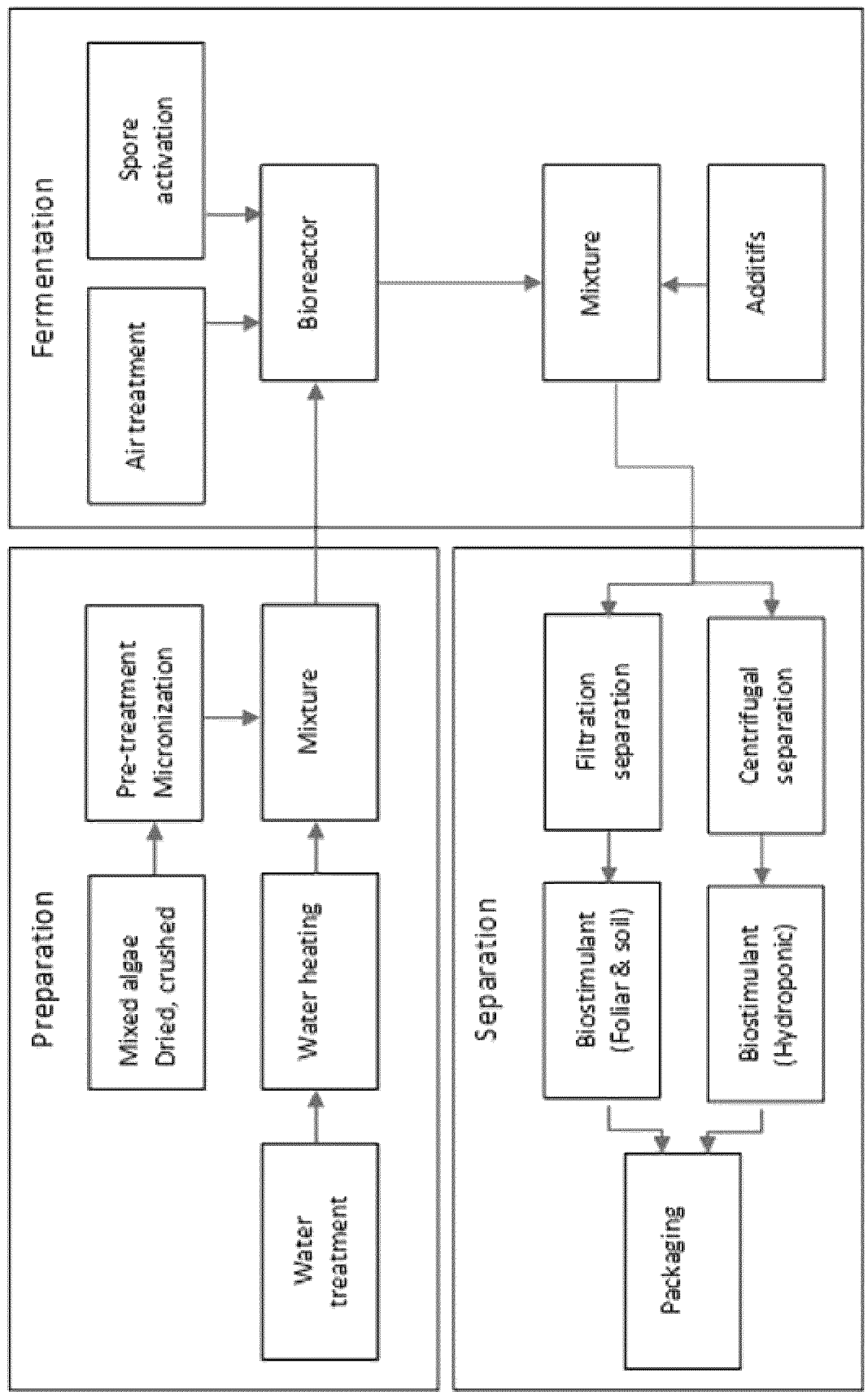
FIG. 1 is a flowchart of the manufacturing process of the biostimulant according to this invention.

FIG. 1 is a schematic diagram showing a complete embodiment of the manufacturing process of the present invention. The complete process generally comprises the following steps: i) preparing the algae; ii) fermentation of the algae in an aqueous solution under aerobic conditions; and iii) separating the components of the fermented solution.

The preparation steps include harvesting, washing, drying, grinding, micronizing and mixing of the algae (biomass) with treated water. The fermentation steps include preactivation of spores and anaerobic fermentation, followed by the addition of organic additives. The resulting product is later separated via filtration or centrifugation, depending on the final use of the biostimulant.

In one aspect of the present invention, due to the presence of a complex cell wall, different extraction techniques (mainly chemical and physical) have been used to maximize the isolation of biologically active compounds from seaweed. However, these methods affect the quality and quantity of extracted organic molecules and bioactive substances of agricultural interest. Microbial fermentation technology is advantageous over other extraction techniques but has gaps to reduce wall stiffness (physical barrier) in order to make biomass highly hydrolyzable by enzymatic attack. Depending on the aspect of the invention, a mechanical grinding pretreatment by micronization of the algae, homogenization of the mixture and the use of a bacterial consortium of Bacillus sp strains with a very active proteolytic activity in a marine algae medium allows to optimize the fermentation process.

In another aspect of the present invention, depending on the aspect of the process, the different varieties of algae harvested are dried in the sun and coarsely ground. They are mixed in a specific ratio (according to the desired formulation) and will then undergo a micronization pretreatment until an ultrafine powder is obtained. The algae are transferred to a tank with filtered water and passed through a mixer to make the mixture homogeneous. The algae-water solution is then transferred to a bioreactor heated to 25-30° C. under continuous agitation. Filtered air is added to the bioreactor via an air diffuser as an oxygen source. The bacterial inoculum previously activated in a specific nutrient medium is added to the mixture. Oxygen and pH are monitored during the fermentation phase, which lasts 36 to 60 hours. A mixture of water and organic additives is added to the post-fermentation solution. The pH of the solution is reduced to 4 with lactic acid to allow a better conservation of the phyto activator. The solution is completed to 1000 litres and then, depending on the final product targeted, it undergoes the separation step in 2 modes:

1) the solution is filtered successively from 800 to 400 µm in order to remove the coarsest particles. The collected filtrate is bottled and becomes the recommended biostimulant for foliar or soil treatments on plants;
2) the solution is sent to the clarification stage by centrifugation. The collected supernatant is bottled and becomes the recommended biostimulant for use in hydroponic applications. Fermented biomass is collected and dried and then transferred for another use.

In one embodiment of the present invention, the different varieties of seaweed to be harvested comprise three (3) varieties of brown seaweed *Saccharina longicruris, Fucus vesiculosus* and *Ascophyllum nodosum* as well as two (2) varieties of red seaweed *Chondrus crispus* and *Furcellaria lumbricalis*. The different varieties of seaweed are harvested in the cold waters of the Canadian Maritime provinces.

In one embodiment, the algae floating freely in the coastal zone were taken from the water to minimize contamination of the biomass.

In another embodiment of the present invention, the washing, drying and grinding of the seaweed further comprise washing the fresh seaweed in seawater to preserve its colour, texture and native microorganisms, naturally drying the seaweed to a humidity level of 25%, and coarsely grinding and sieving the algae to a particle size between 4-6 mesh.

In another embodiment of the present invention, the pre-treatment by micronization further comprises the algae being micronized to obtain an ultrafine powder (10 to 30 µm). This method reduces the physical barrier of the algae cell wall to facilitate microbial enzymatic lysis produced by fermentation.

In another embodiment of the present invention, the homogeneous mixing of algae and water comprises adding filtered water to the mixer (adapted to high viscosity solutions) to incorporate micronized algae at a rate of 10% (w/v) whose formulation is 90% brown algae (ratio 1:1:1 for the 3 varieties) and 10% red algae (ratio 1:1 for the 2 varieties). The water is dechlorinated using an activated carbon filter (since chlorine is toxic to the bacterial consortium). The algae mixture in solution will be fed to a retention tank and recirculated several times with the mixer.

In another embodiment of the present invention, the activation of microbial spores comprises the bacterial inoculum being preactivated in a specific nutrient medium to reduce latency time. The bacterial inoculum is further cultured at 25° C., shaken at 250 rpm for 16-18 hours in a sterile 100 L fermenter to achieve a sufficient bacterial concentration before inoculating the bioreactor. The inoculum is generated in a small-scale laboratory and then its volume is sequentially increased. The pre-culture is then checked under a microscope to ensure proper bacterial growth. The production of cuve type inoculum (batch) is more appropriate given its simplicity and the good reproducibility of the inoculate that will result. For example, a 100-fold volume increase ratio can be used each day to increase from 1 L to 100 L, then 10,000 L, etc. This process will allow active and exponential cells to be produced in a volume representing 1% of the total volume of fermentation. The bacterial count is at least 60 million CFU/ml.

In another embodiment of the present invention, the bacterial consortium developed specifically for the fermentation of mixed marine algae of the present invention was selected due to their very active proteolytic activity and optimal growth in a mixed marine algae environment, the bacterium consortium comprising bacteria selected from the following three (3) strains of Bacillus: *B. amyloliquefacins* (U55), *B. amyloliquefacins* (U50) and *B. licheniformis* (U53).

These strains were identified by sequencing a significant portion of the 16SRNA and a portion of the gene encoding gyrase A. They are of neutral to slightly acidic class, thus facilitating the fermentation process in algae, viscous and saline environments. They secrete a large number of extracellular enzymes (alginate lyase, proteases, pectinases and lipases) useful for hydrolyzing macromolecules into smaller sizes (immune system inducers and organic supplements) easily assimilated by the endogenous flora of the soil and by plants thereafter.

In a specific embodiment of the invention, the bacterium consortium includes bacteria from all three (3) strains, namely, *B. amyloliquefacins* (U55), *B. amyloliquefacins* (U50) and *B. licheniformis* (U53).

In another embodiment of the present invention, controlled aerobic fermentation comprising the algae-water mixture and pre-activated inoculum are transferred to the bioreactor. The bioreactor is further equipped with instrumentation and controllers for agitation, aeration, temperature, pH, foam and dissolved oxygen to monitor microbial growth kinetics. The temperature is adjusted between 25 and 30° C., the agitation is continuous and varies between 60 and 175 rpm and the aeration rate is adjusted during fermentation between 0,155 and 1,117 vvm to maintain more than 20% dissolved oxygen in the solution.

In another embodiment of the present invention, as soon as they are incubated in algae medium, bacillus cells are in vegetative form and will enter the exponential phase after 12-14 hours. This phase lasts about 36-60 hours when the proteolytic activity reaches the highest level (pH increases due to proteolysis and ammonia release). Beyond this period, a steady state is generally observed, corresponding to the formation of spores.

In another embodiment of the present invention, additives added at the end of fermentation: natural additives are added in a small volume of water before being transferred to the fermented solution. They include a substantial amount of *yucca* extract (2% v/v), calcium carbonate (1% w/v) and oligo-chitosan (0.1% v/v). In order to ensure proper preservation of the biostimulant, potassium sorbate (1% w/v) is added to the medium and the pH is reduced to 4 with lactic acid (2-3% v/p). The final solution is completed to 1000 litres and then, depending on the final product targeted, undergoes two distinct separation levels.

In another embodiment of the present invention, separation of the product post-fermentation is based on the final use of the product either in foliar or soil treatments on plants or in hydroponic applications, the separation steps being described in the following paragraphs.

In another embodiment of the present invention, separation of the product for foliar or soil treatments on plants; the fermented solution is filtered successively from 800 to 400 µm in order to remove the coarsest particles. The current method used for separation is front filtration with a stainless steel basket filter to remove particles 800 microns and larger, as well as nylon bag filters to remove particles 400 microns and larger. A diaphragm pump is used to create the pressure differential. The collected filtrate is bottled and becomes the recommended biostimulant for foliar or soil treatments on plants.

Figure 2:
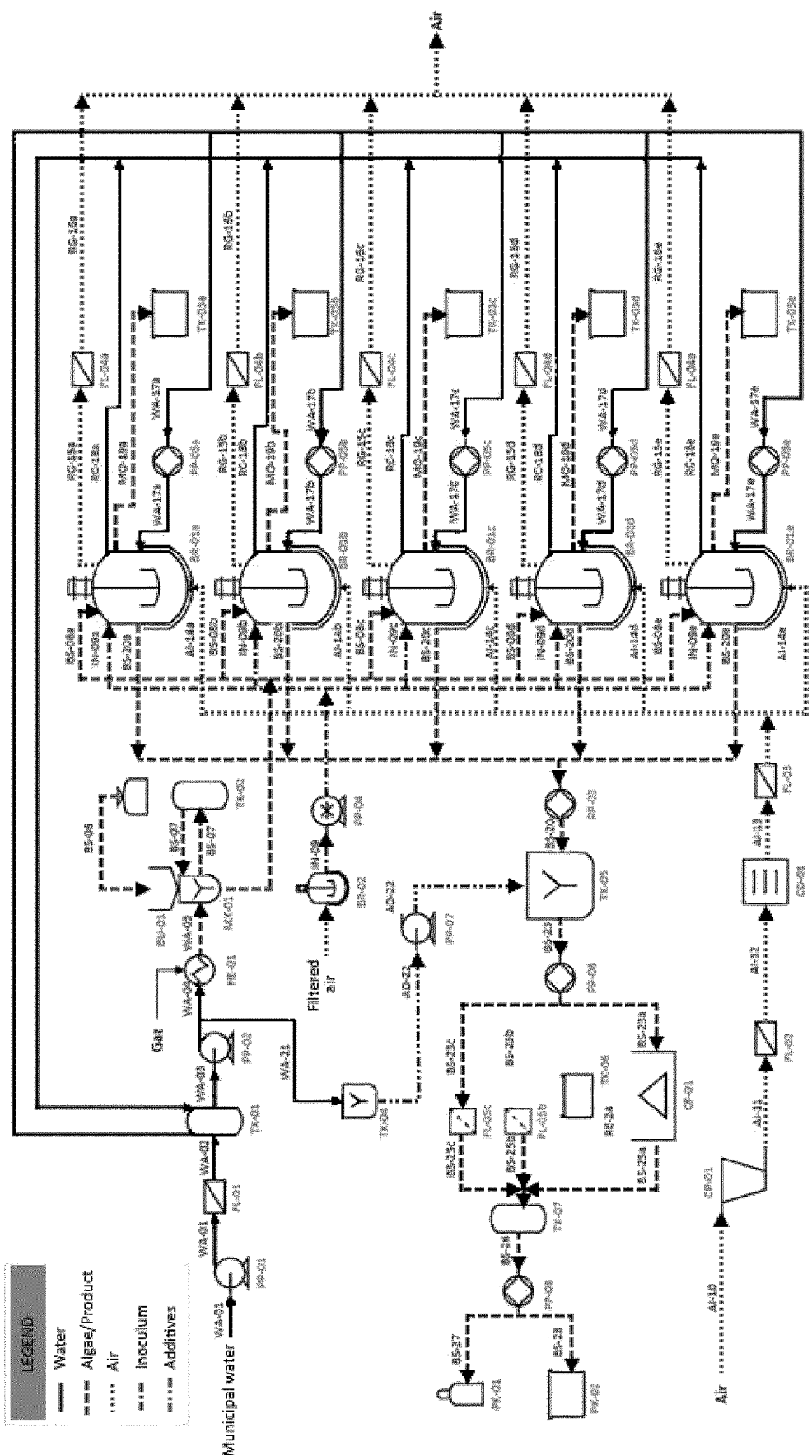
FIG. 2 is a schematic illustration of a detailed flowchart of the biostimulant manufacturing process according to this invention.

In another embodiment of the present invention, separation of the product for use in hydroponic applications; the fermented solution is further clarified to ensure that it will not clog very fine irrigation nozzles. The solution is sent to a centrifugal clarifier whose operation accelerates the sedimentation of rotating particles. This system allows the continuous discharge of solids and the collection of a clarified liquid. The collected supernatant is bottled and becomes the recommended biostimulant for use in hydroponic applications or for irrigation systems using very fine nozzles. Fermented biomass is collected and dried and then transferred for another use. In another embodiment of the present invention, a detailed schematic of the manufacturing process is described in FIG. 2.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A process for the manufacture of a biostimulant comprising:
   homogeneous mixing of algae in an aqueous solution, the algae being a formulation comprising *Saccharina longicruris, Fucus vesiculosus, Ascophyllum nodosum, Chondrus crispus* and *Furcellaria lumbricalis;*
   adding preactivated bacterial spores; and
   allowing aerobic fermentation of the aqueous solution.

2. The process of claim 1, further comprising adding organic additives to the aqueous solution following aerobic fermentation to create a post-fermentation solution.

3. The process of claim 2, wherein the organic additives comprise *yucca* extract, calcium carbonate and oligo-chitosan.

4. The process of claim 3, wherein the *yucca* extract, calcium carbonate and oligo-chitosan represent, respectively, 2% (v/v), 1% (w/v) and 0.1% (v/v) of the post-fermentation solution.

5. The process of claim 3, wherein potassium sorbate is added to the post-fermentation solution and the pH is reduced to 4 with lactic acid.

6. The process of claim 5, wherein the potassium sorbate is 1% (w/v) and the lactic acid is 2-3% (v/v).

7. The process of claim 2, wherein the post-fermentation solution is separated in one or more separation steps, the one or more separation steps comprising:
   filtering the aqueous solution to remove the coarsest particles;
   collecting a filtrate;
   clarifying the filtrate through centrifugation; and
   collecting a supernatant.

8. The process of claim 1, wherein the algae is washed, dried and ground following harvesting and prior to the homogeneous mixing in the aqueous solution.

9. The process of claim 8, wherein the algae is ground further through micronization.

10. The process of claim 1, wherein the formulation of the algae comprises 30% each of *Saccharina longicruris, Fucus vesiculosus* and *Ascophyllum nodosum* and 5% each of *Chondrus crispus* and *Furcellaria lumbricalis*.

11. The process of claim 1, wherein the algae is micronized and is present in a 10% (w/v) aqueous solution.

12. The process of claim 1, wherein the preactivated bacterial spores are comprised of a Bacillus sp bacterial consortium.

13. The process of claim 12, wherein the Bacillus sp bacterial consortium comprises a combination of bacteria chosen from *B. amyloliquefacins* and *B. licheniformis*.

14. The process of claim 1, further comprising adding organic additives to the aqueous solution following aerobic fermentation to create a post-fermentation solution, the organic additives comprising *yucca* extract.

15. A method for the manufacture of a biostimulant or natural fertilizer based on the fermentation of algae, the algae being a formulation comprising *Saccharina longicruris, Fucus vesiculosus, Ascophyllum nodosum, Chondrus crispus* and *Furcellaria lumbricalis*, the method comprising:
   harvesting, washing, drying and grinding of seaweed;
   micronizating the dried seaweed;
   homogeneously mixing the seaweed in an aqueous solution;
   preactivating bacterial spores;
   adding the preactivated bacterial spores to the aqueous solution and allowing the solution to ferment under aerobic conditions;
   adding organic additives to the aqueous solution following aerobic fermentation to create a post-fermentation solution; and
   separating the components of the fermented solution in one or more separation steps.

16. A method as defined in claim 15, wherein the preactivated bacterial spores are comprised of a Bacillus sp bacterial consortium.

17. A method as defined in claim 16, wherein the Bacillus sp bacterial consortium comprises a combination of bacteria chosen from *B. amyloliquefacins*, and *B. licheniformis*.

18. The method of claim 15, wherein the organic additives comprise *yucca* extract, calcium carbonate and oligo-chitosan.

19. The method of claim 18, wherein potassium sorbate is added to the post-fermentation solution and the pH is reduced to 4 with lactic acid.

20. The process of claim 15, wherein the post-fermentation solution is separated in one or more separation steps, the one or more separation steps comprising:
   filtering the aqueous solution to remove the coarsest particles;
   collecting a filtrate;
   clarifying the filtrate through centrifugation; and
   collecting a supernatant.

21. A process for the manufacture of a biostimulant comprising:
   micronizing a macroalgae mixture at 10 to 30 µm, the macroalgae mixture comprising *Saccharina longicruris, Fucus vesiculosus, Ascophyllum nodosum, Chondrus crispus* and *Furcellaria lumbricalis;*
   homogeneously mixing the micronized macroalgae mixture in an aqueous solution;
   adding preactivated spores of Bacillus sp bacterial consortium to the mixed aqueous solution; and
   allowing aerobic fermentation of the aqueous solution mixed with micronized macroalgae and comprising the preactivated spores.

* * * * *